(12) United States Patent
Trautwein et al.

(10) Patent No.: US 7,050,948 B2
(45) Date of Patent: May 23, 2006

(54) METHOD AND COMPUTER PROGRAM PRODUCT FOR EVALUATION OF DATA RECORDED BY MEASURING INSTRUMENTS

(75) Inventors: Uwe Trautwein, Gehren (DE); Fred Vogler, Langewiesen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/479,308

(22) PCT Filed: May 23, 2002

(86) PCT No.: PCT/EP02/05685

§ 371 (c)(1),
(2), (4) Date: Jun. 24, 2004

(87) PCT Pub. No.: WO02/099687

PCT Pub. Date: Dec. 12, 2002

(65) Prior Publication Data

US 2004/0249587 A1    Dec. 9, 2004

(30) Foreign Application Priority Data

May 28, 2001   (DE)   ................... 101 27 239

(51) Int. Cl.
   *G06F 19/00*   (2006.01)
   *G06K 5/04*    (2006.01)
(52) U.S. Cl. .................. 702/189; 356/3; 356/3.01; 356/614; 356/616; 356/622; 356/401; 235/462.08
(58) Field of Classification Search ............... None
See application file for complete search history.

(56) References Cited

U.S. PATENT DOCUMENTS

| | | | |
|---|---|---|---|
| 3,800,079 A * | 3/1974 | McNeil et al. | 348/247 |
| 5,068,912 A * | 11/1991 | Concannon et al. | 382/255 |
| 5,420,945 A * | 5/1995 | Concannon et al. | 382/312 |
| 5,606,173 A * | 2/1997 | Concannon et al. | 250/559.3 |
| 5,734,172 A * | 3/1998 | Pryor et al. | 250/559.23 |
| 6,097,490 A * | 8/2000 | Holzapfel et al. | 356/614 |

(Continued)

FOREIGN PATENT DOCUMENTS

DE          3242967 A1     5/1984

(Continued)

*Primary Examiner*—Patrick J. Assouad
(74) *Attorney, Agent, or Firm*—Kriegsman & Kriegsman

(57) ABSTRACT

The invention describes a method and computer program product for the evaluation of data recorded by measuring instruments, which is particularly applicable to the precise localization of non-reflecting marks on a reflecting medium by means of a light-sensitive receiver and can be especially applied in precision positioning devices. The method comprises a first step in which data are recorded from a sensor on a measuring instrument with a minimized or extinguished measured signal and which is stored as a dark curve, a second step in which data of a normalized measured signal are recorded and stored as a reference curve, and a third step in which data for the current measurement are recorded and stored as a characteristic curve; the characteristic curve is then purged of errors caused by the measuring instrument by comparison against the dark curve or reference curve and normalized and the characteristic curve thus treated is stored as the target curve, and finally the target curve is evaluated for various values of the measured signal. The computer program product can be loaded directly into the internal memory of a computer and comprises software code sections, with which the above described method may be carried out when the product is running on a computer.

8 Claims, 4 Drawing Sheets

U.S. PATENT DOCUMENTS

2002/0118614 A1 * 8/2002 Watt et al. ............... 369/44.29

FOREIGN PATENT DOCUMENTS

| DE | 8528346 U1 | 3/1987 |
| --- | --- | --- |
| DE | 3743847 A1 | 7/1989 |
| DE | 3924290 C2 | 6/1991 |
| DE | 4033083 A1 | 4/1992 |
| DE | 4334060 A1 | 5/1994 |
| DE | 4312403 A1 | 10/1994 |
| DE | 19502858 C1 | 7/1996 |
| DE | 4401592 C2 | 9/1996 |
| DE | 19612660 A1 | 10/1997 |
| DE | 19635968 A1 | 3/1998 |
| DE | 19636443 A1 | 3/1998 |
| WO | WO98/13669 | 4/1998 |

* cited by examiner

METHOD AND COMPUTER PROGRAM PRODUCT FOR EVALUATION OF DATA RECORDED BY MEASURING INSTRUMENTS

BACKGROUND OF THE INVENTION

The invention concerns a method and a computer program product for the evaluation of data recorded by measuring instruments, which are particularly applicable to the precise localization of non-reflecting marks on a reflecting medium by means of a light-sensitive receiver and can be especially applied in precision positioning devices.

In signal processing, a plurality of methods exist for detecting edges or points in a signal curve. For the most part these contain complicated processing instructions, which cause problems in implementation on a microcomputer system with limited resources.

In addition, these methods permit only the determination of the relative position of marks since the detected signals are evaluated in the receiver plane. Positions of several non-reflecting marks on a reflecting medium can in fact be determined relative to one another with sufficient precision; the absolute position of the marks, however, previously could not be determined with high precision directly from the (optical) measured signals that were available.

SUMMARY OF THE INVENTION

The object of the present invention is to eliminate the disadvantages of the known evaluation methods and to provide an optimized method for the exact localization of a signal (point).

This object is solved according to the invention by the features in the characterizing part of claims 1, 6 and 7 in conjunction with the features in the preamble. Appropriate configurations of the invention are contained in the subclaims.

A particular advantage of the invention lies in the fact that in the method for the evaluation of data recorded by measuring instruments, in a first step, the data supplied by the sensor(s) of the measuring instrument(s) with a minimized or extinguished measured signal are recorded and stored as a dark curve; in a second step, data of a normalized measured signal are recorded and stored as a reference curve; in a third step, the data of the current measurement are recorded and are stored as a characteristic curve 6; then the characteristic curve 6 is purged of errors caused by the measuring instrument by comparison with the dark curve and/or the reference curve and/or is normalized; and the thus-treated characteristic curve is stored as the target curve and finally the target curve is evaluated for different values of the measured signal.

The computer program product for the evaluation of data recorded by measuring instruments is characterized in that it can be loaded directly into the internal memory of a digital computer and comprises software code sections with which the steps according to claim 1 can be carried out when the product is running on a computer.

Another advantage of the computer program product lies in the fact that it is stored on at least one medium suitable for computers and comprises the following: computer-readable program means, which cause a computer and/or a microcontroller to detect and to store data recorded by a measuring instrument; computer-readable program means, which cause a computer and/or a microcontroller to compare the detected and stored data with one another to purge these [data] of errors and/or to normalize the data. The method according to the invention makes it possible to achieve the localization of a mark with high precision and with minimal technical expenditure. For this purpose, the following steps are conducted: preparation (calibration), normalization, evaluation of the target curve for special values of the measured signal (determining the mean value for defining the pixel position). The combination of all of these steps of the method according to the invention supplies the required high resolution in determining the position of marks. (When only a small resolution is required, individual steps may optionally be omitted.) In addition, the working out of the method by the relatively simple calculating operations is possible even on small computer systems.

BRIEF DESCRIPTION OF THE DRAWINGS

The invention will be explained in more detail below on the basis of embodiment examples shown at least partially in the Figures.

Here.

DETAILED DESCRIPTION OF THE INVENTION

One variant of the embodiment of the method is demonstrated on the example of the detection of a mark pattern in the signal curve of an optical image.

Figure 1:
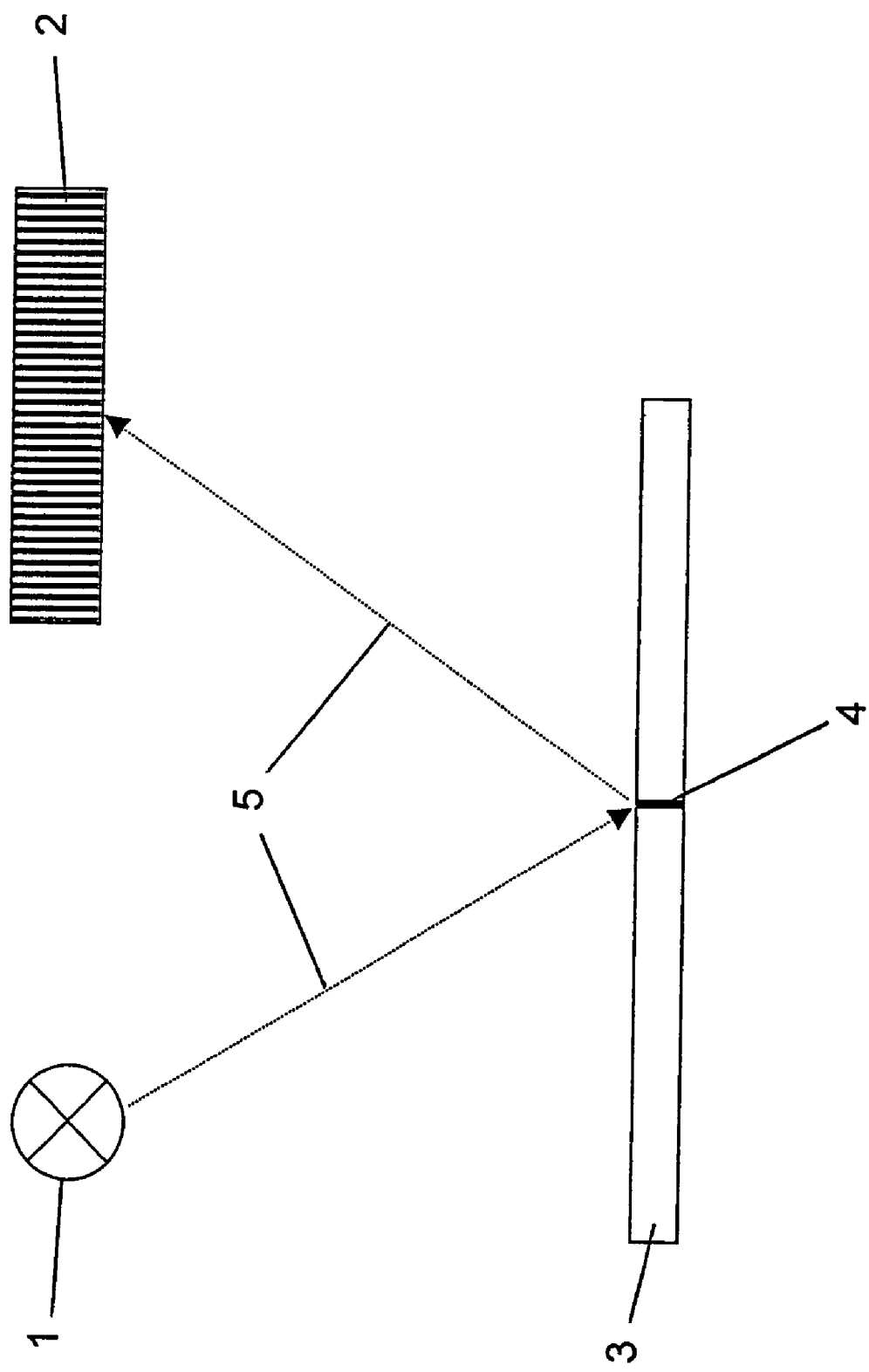
FIG. 1 shows a schematic representation of the arrangement of the instrument for conducting the method.

One possible device for conducting the method according to the invention is produced by a combination of light source 1 and a light-sensitive receiver 2 or receiver field (as a module), which are arranged over a reflecting scale 3 containing non-reflecting marks 4 (see FIG. 1). The individual components are arranged such that the reflecting scale 3 is irradiated by light source 1 and the light reflected at scale 3 is detected by receiver 2 or the receiver field. By this arrangement of elements, an optical image of the marks on reflecting scale 3 is assured by the light field 5 of light source 1 on the light-sensitive receiver 2. The intensity curve reflected by reflecting scale 3 contains information in the form of signal troughs, which represent the position of marks 4 with respect to the light-sensitive receiver 2. Thus, a significant intensity curve, which is named characteristic curve 6 and which contains the positions of the marks, is formed in the receiver plane (see FIG. 2a).

The relative position of marks 4 in the receiver plane is determined from this intensity curve of characteristic curve 6 by means of a special calculation procedure for the detection of marks.

These relative positions of the marks must now be transformed into the absolute position of the marks 4 in the scale plane. As a prerequisite for working out the subsequent method steps, the knowledge of the dark curve and the reference curve, which will be denoted the light curve in the special case of detection of marks by means of an optical detector, is necessary.

The dark curve represents the different dark signals produced by individual types of detection on a light-sensitive receiver 2. It is thus recorded with a minimized measured signal—here the intensity of the reflected light; ideally the measured signal should be extinguished for the plotting of the dark curve. These data are important, since the recorded intensity signals scatter due to the different transformation properties of light-sensitive receiver 2 or the receiver lines. The dark curve thus describes the offset behavior of the receiver 2.

Another correction of characteristic curve 6 must be conducted as a function of light source 1. For example, if the reflecting metal scale 3 is illuminated with a punctiform light source 1, then the beam pattern reflected back onto the light-sensitive receiver 2 or the receiver lines is characterized by the divergence of the beam bundle or the distance between light source 1, metal scale 3 and receiver 2. This [pattern] can be recognized at the edge cutoff of the received signals. The light curve thus contains the intensity curve in the receiver plane without non-reflecting marks 4. This curve is determined by the beam characteristic of the emitter, the receiving properties (to transform light into an electrical signal), the reflection properties of scale 3 and the marks.

Figure 2:
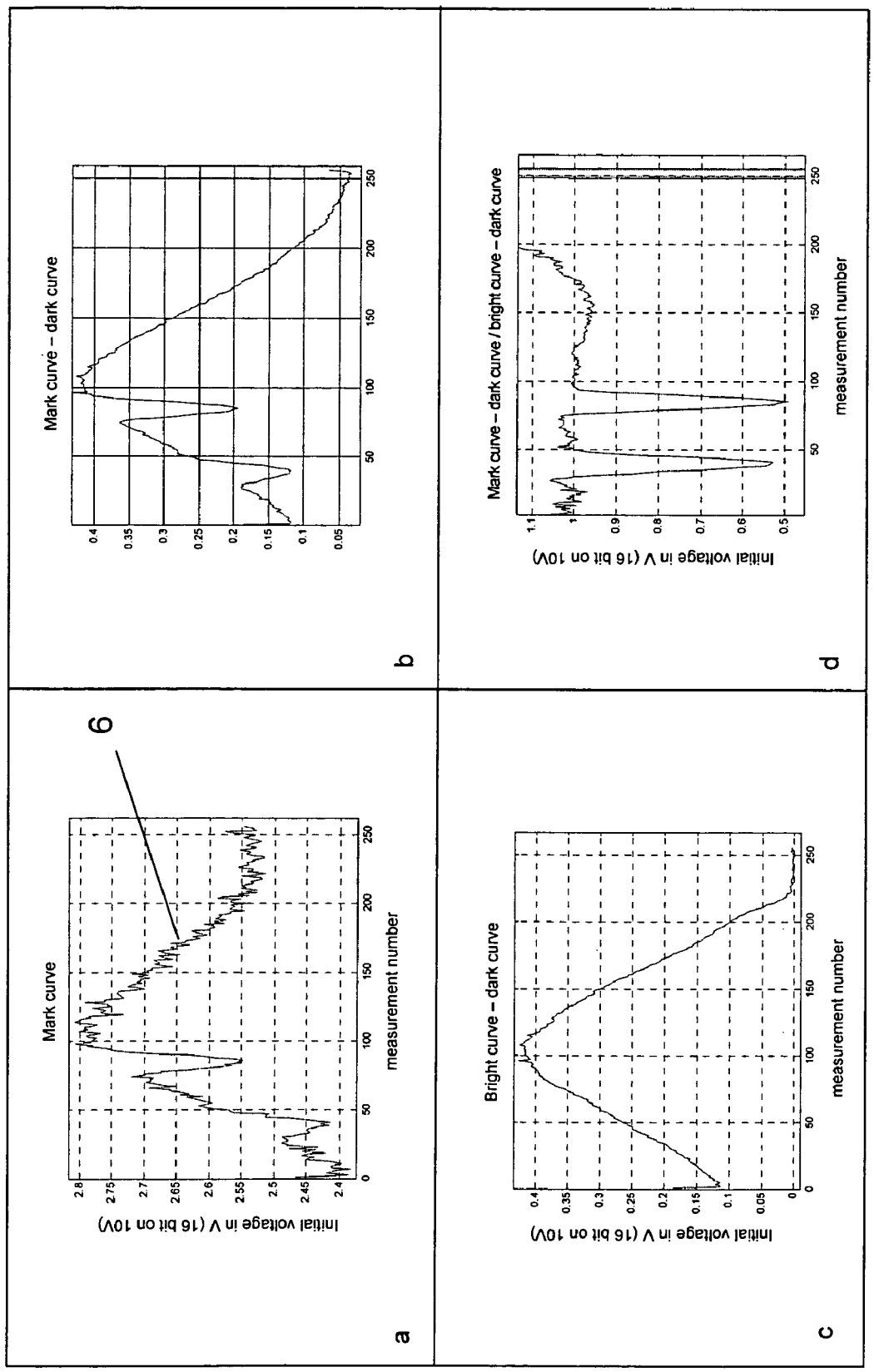
FIG. 2a shows characteristic curve 6: Intensity distribution of the light reflected at the medium onto the receiver surface.
FIG. 2b shows the intensity distribution after removing the so-called dark curve (see below) from the characteristic curve 6.
FIG. 2c shows the curve of the intensity distribution of the so-called light curve (see below) after removing the dark curve.
FIG. 2d shows the curve of the normalized intensity distribution.

In order to optimize the evaluation of the determined measured values, which are represented by the characteristic curve 6, a normalization is required. This is achieved by subtracting the dark curve from the intensity curve of characteristic curve 6. The result—the characteristic curve minus the dark curve—is shown in FIG. 2b. Now the dark curve is also subtracted from the light curve, which gives as a result the light curve minus the dark curve (FIG. 2c); then the previously determined characteristic curve minus the dark curve is divided by the light curve minus the dark curve and a curve is formed (see FIG. 2d), which permits the evaluation of the measured values, in contrast to the untreated characteristic curve 6. This normalized curve serves as a basis for the following determination of the relative position of marks in the receiver plane.

Figure 3:
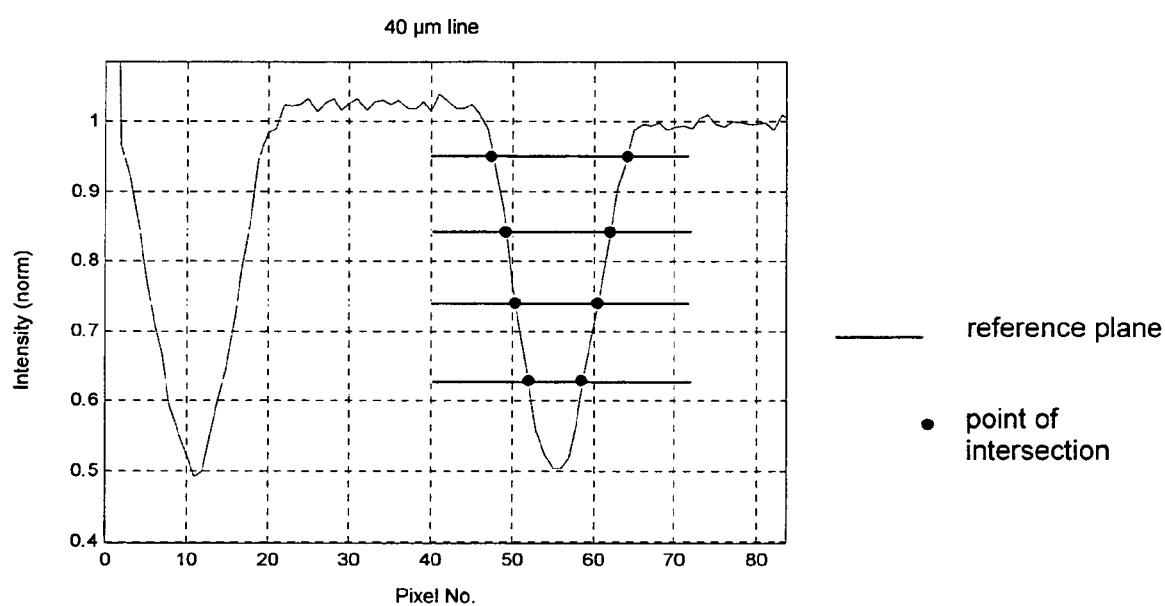
FIG. 3 is a representation for clarifying the determination of the mark position (pixel no.) by evaluating different values of the measured signal (determining the mean value)

For this purpose, the points of intersection with the normalized intensity curve are determined in specific reference planes which are set for pregiven intensity values by the course of the normalized curve (see FIG. 3). The pixels of the receiver plane are used as a measure for the relative position of marks for this example of embodiment. The mean of all pixel values of the points of intersection yields the mark position in the receiver plane for one mark 4.

Finally, in conjunction with the method according to the invention, the conversion results in the precise absolute position of mark 4 in the plane of the scale. A transformation of the position of the marks results due to the projection of the mark patterns in the receiver plane. However, this can be corrected.

Figure 4:
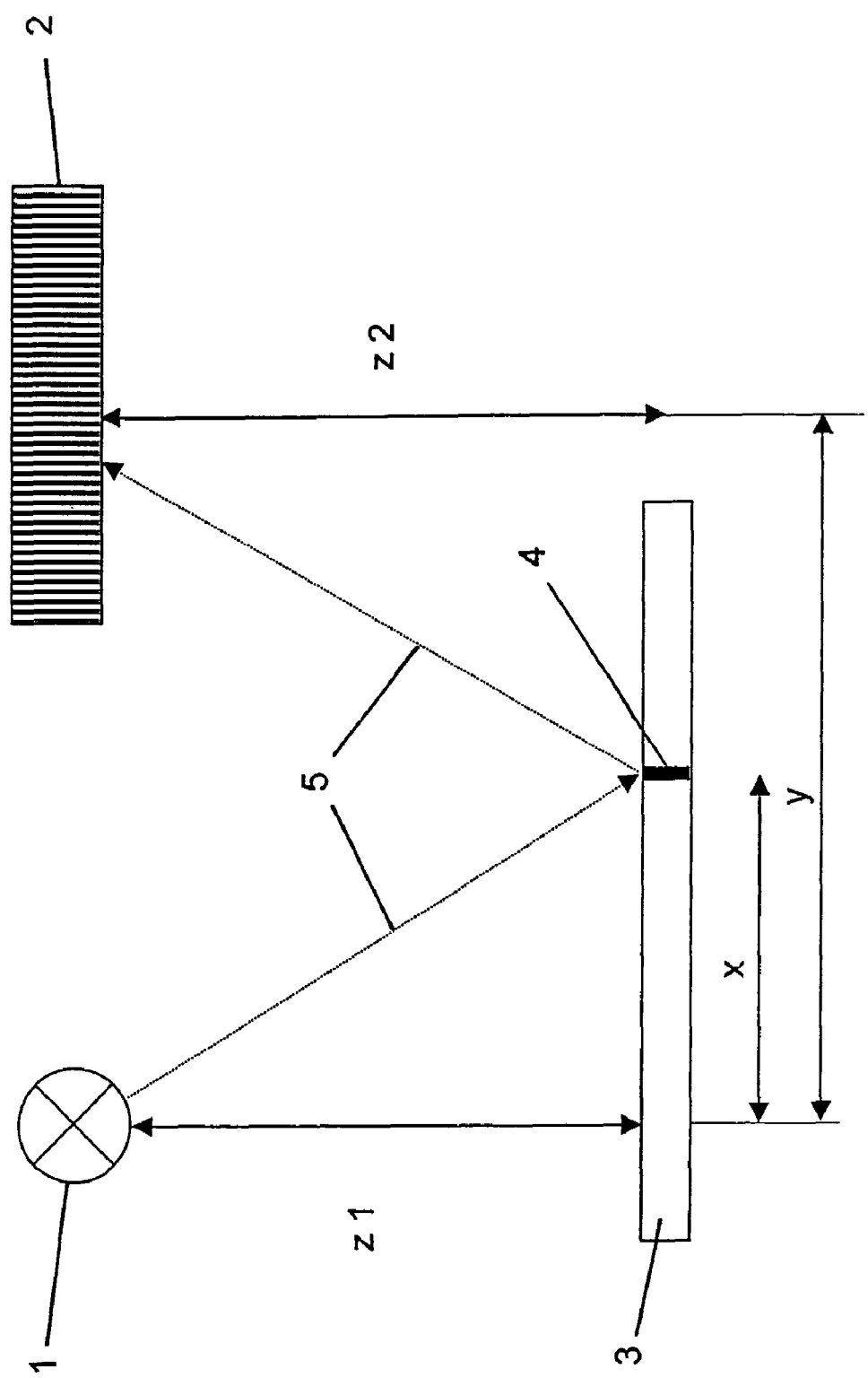
FIG. 4 shows a sketch for explaining the calculation procedure for determining the position of marks.

From the knowledge of the distance $Z_2$ between the receiver plane and scale 3, the position x of mark 4 is determined from the mark position y in the receiver plane via the beam relative to the perpendicular line from light source 1 to scale 3 (see FIG. 4). Thus, the calculation procedure is simplified to:

$$x = y \cdot z1/(z1+z2).$$

In order to optionally convey further information, in addition to the absolute position of the marks, the marks could also be structured in the form of a barcode.

The invention is not limited to the embodiment examples presented here. Rather, it is possible to produce additional embodiment variants by combination and modification of the named means and features without leaving the scope of the invention.

LIST OF REFERENCE NUMBERS

1. Light source
2. Light-sensitive receiver
3. Reflecting scale
4. Non-reflecting mark
5. Beam field
6. Characteristic curve

The invention claimed is:

1. A method for the highly precise determination of the position of a mark pattern in a measured signal obtained by optical sensors for the detection of marks on a scale, wherein data supplied by the optical sensors with a minimized or extinguished measured signal are recorded and stored as a dark curve, the data of a normalized measured signal are recorded and stored as a reference curve, the data of the current measurement are recorded and are stored as a characteristic curve, and then the characteristic curve is purged of errors caused by the measuring instrument by comparison with the dark curve and/or the reference curve and/or is normalized, and the thus-treated characteristic curve is stored as the target curve, is hereby characterized in that marks are used for the labeling of the scale and the measured signal is evaluated by determining the points of intersection of the target curve with the intensity levels determined by the intensity values for intensity values of the target curve that can be given in advance, and forming a mean value representing the position of a mark pattern from the determined points of intersection or combining the determined intersection points into groups and then forming a mean value representing the position of a mark pattern for each group from the intersection points belonging thereto.

2. The method according to claim 1, further characterized in that the purging of errors caused by the measuring instrument is conducted by subtracting the dark curve from the characteristic curve.

3. The method according to one of claims 1 to 2, further characterized in that the normalization is conducted by forming the quotient from the characteristic curve purged of errors caused by the measuring instrument and the reference curve.

4. The method according to one of claims 1 to 2, further characterized in that from the position of mean values representing a mark pattern absolute mark positions x referred to the perpendicular line erected from the light source to the scale are calculated according to $$x = y \cdot z_1/(z_1+z_2),$$

wherein y describes the mark position in the receiver plane referred to the perpendicular line erected from the light source to the scale, $z_1$ describes the distance between the scale and light source and $z_2$ describes the distance between the receiver plane and the scale.

5. The method according to one of claims 1 to 2, further characterized in that a reflecting scale and a non-reflecting mark are used.

6. An arrangement with at least one processor, which is aligned such that a method for the highly precise determination of the position of a mark pattern in a measured signal obtained by optical sensors can be conducted according to one of claims 1 to 2.

7. The arrangement according to claim 6, further characterized in that at least one light source, at least one light-sensitive receiver and a reflecting scale are arranged such that the reflecting scale can be irradiated from the at least one light source and the light reflected at the reflecting scale can be detected by the at least one receiver.

8. The arrangement according to claim 6, further characterized in that the reflecting scale has non-reflecting marks.

* * * * *